(12) United States Patent
Gonze et al.

(10) Patent No.: US 8,479,496 B2
(45) Date of Patent: Jul. 9, 2013

(54) SELECTIVE CATALYTIC REDUCTION SYSTEM USING ELECTRICALLY HEATED CATALYST

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 869 days.

(21) Appl. No.: 12/496,773

(22) Filed: Jul. 2, 2009

(65) Prior Publication Data

US 2011/0000194 A1 Jan. 6, 2011

(51) Int. Cl.
- *F01N 3/00* (2006.01)
- *F01N 3/10* (2006.01)
- *F01N 3/02* (2006.01)

(52) U.S. Cl.
USPC ............ 60/286; 60/274; 60/295; 60/297; 60/300; 60/301; 60/303; 60/311

(58) Field of Classification Search
USPC ............ 60/274, 286, 295, 297, 300, 301, 60/303, 311
See application file for complete search history.

(56) References Cited

U.S. PATENT DOCUMENTS

| | | | |
|---|---|---|---|
| 4,404,795 A | 9/1983 | Oishi et al. | |
| 4,404,796 A | 9/1983 | Wade | |
| 4,427,418 A | 1/1984 | Kogiso et al. | |
| 4,516,993 A | 5/1985 | Takeuchi et al. | |
| 4,549,395 A | 10/1985 | Dammann | |
| 4,549,398 A | 10/1985 | Oishi et al. | |
| 4,685,290 A | 8/1987 | Kamiya et al. | |
| 5,144,798 A | 9/1992 | Kojima et al. | |
| 5,171,335 A | 12/1992 | Kojima et al. | |
| 5,195,316 A | 3/1993 | Shinzawa et al. | |
| 5,207,807 A | 5/1993 | Manfre et al. | |
| 5,458,673 A | 10/1995 | Kojima et al. | |
| 5,472,462 A * | 12/1995 | Pischinger et al. | ............ 55/282 |
| 5,616,835 A | 4/1997 | Schnaibel et al. | |
| 5,711,149 A | 1/1998 | Araki | |
| 5,716,586 A | 2/1998 | Taniguchi | |
| 5,732,550 A | 3/1998 | Muramatsu et al. | |
| 5,839,279 A | 11/1998 | Moriya et al. | |
| 6,013,118 A | 1/2000 | Matsunuma et al. | |
| 6,050,086 A | 4/2000 | Ishizuka et al. | |
| 6,090,172 A | 7/2000 | Dementhon et al. | |
| 6,167,696 B1 | 1/2001 | Maaseidvaag et al. | |
| 6,176,896 B1 | 1/2001 | Dementhon et al. | |
| 6,405,528 B1 | 6/2002 | Christen et al. | |
| 6,634,170 B2 | 10/2003 | Hiranuma et al. | |

(Continued)

FOREIGN PATENT DOCUMENTS

| CN | 1535351 | 10/2004 |
|---|---|---|
| CN | 1540143 | 10/2004 |

(Continued)

*Primary Examiner* — Thomas Denion
*Assistant Examiner* — Diem Tran (57) ABSTRACT

An exhaust system includes N heating elements and a particulate matter (PM) filter. The N heating elements heat N portions of an exhaust gas. At least one of the N heating elements is coated with a first selective catalytic reduction (SCR) catalyst. The PM filter has an inlet that receives the N portions of the exhaust gas heated by the N heating elements. Each of the N portions of the exhaust gas heats a corresponding region of the inlet. N is an integer greater than 1.

16 Claims, 4 Drawing Sheets

U.S. PATENT DOCUMENTS

| | | | |
|---|---|---|---|
| 6,769,246 B2 | 8/2004 | Strohmaier et al. | |
| 6,781,098 B2 | 8/2004 | Toyoda | |
| 6,973,778 B2 | 12/2005 | Kondou et al. | |
| 7,062,904 B1 * | 6/2006 | Hu et al. | 60/286 |
| 7,073,326 B2 | 7/2006 | Cheong | |
| 7,111,455 B2 | 9/2006 | Okugawa et al. | |
| 7,146,804 B2 | 12/2006 | Yahata et al. | |
| 7,171,801 B2 | 2/2007 | Verkiel et al. | |
| 7,288,137 B2 | 10/2007 | Iyer et al. | |
| 7,340,887 B2 | 3/2008 | Ante et al. | |
| 7,412,822 B2 | 8/2008 | Zhan et al. | |
| 7,607,295 B2 | 10/2009 | Yokoyama et al. | |
| 7,615,725 B2 | 11/2009 | Kosaka et al. | |
| 7,631,493 B2 | 12/2009 | Shirakawa et al. | |
| 7,685,811 B2 | 3/2010 | Taylor et al. | |
| 7,794,528 B2 | 9/2010 | Tochikawa et al. | |
| 7,886,529 B2 | 2/2011 | Gonze et al. | |
| 7,896,956 B2 | 3/2011 | Takase et al. | |
| 7,901,475 B2 * | 3/2011 | Gonze et al. | 55/282.3 |
| 8,037,673 B2 * | 10/2011 | Gonze et al. | 60/284 |
| 8,146,350 B2 * | 4/2012 | Bhatia et al. | 60/295 |
| 8,292,987 B2 | 10/2012 | Gonze et al. | |
| 2003/0000188 A1 | 1/2003 | Harada et al. | |
| 2003/0113249 A1 | 6/2003 | Hepburn et al. | |
| 2003/0131592 A1 | 7/2003 | Saito et al. | |
| 2004/0134187 A1 | 7/2004 | Inoue et al. | |
| 2004/0194450 A1 | 10/2004 | Tanaka et al. | |
| 2005/0072141 A1 | 4/2005 | Kitahara | |
| 2005/0198944 A1 | 9/2005 | Saitoh et al. | |
| 2006/0075731 A1 | 4/2006 | Ohno et al. | |
| 2006/0254265 A1 | 11/2006 | Odajima et al. | |
| 2007/0062181 A1 | 3/2007 | Williamson et al. | |
| 2007/0137186 A1 | 6/2007 | Igarashi | |
| 2007/0214778 A1 | 9/2007 | Narita et al. | |
| 2007/0220869 A1 | 9/2007 | Gonze et al. | |
| 2007/0220870 A1 | 9/2007 | Gonze et al. | |
| 2007/0227104 A1 | 10/2007 | Gonze et al. | |
| 2007/0245721 A1 | 10/2007 | Colignon | |
| 2008/0041035 A1 | 2/2008 | Sawada et al. | |
| 2008/0083212 A1 | 4/2008 | Ament et al. | |
| 2008/0295483 A1 | 12/2008 | Scaife et al. | |
| 2009/0064664 A1 | 3/2009 | Hirata et al. | |
| 2009/0071128 A1 | 3/2009 | Gonze et al. | |
| 2009/0113883 A1 | 5/2009 | Bhatia et al. | |
| 2009/0158715 A1 | 6/2009 | Stroh et al. | |
| 2009/0183501 A1 | 7/2009 | Gonze et al. | |
| 2009/0288398 A1 | 11/2009 | Perfetto et al. | |
| 2010/0095657 A1 | 4/2010 | Gonze et al. | |
| 2010/0126145 A1 | 5/2010 | He et al. | |

FOREIGN PATENT DOCUMENTS

| | | |
|---|---|---|
| CN | 101091038 A | 12/2007 |
| CN | 101429884 A | 5/2009 |
| CN | 1446222 | 6/2009 |
| DE | 102008046706 | 4/2009 |
| DE | 102008046924 A1 | 4/2009 |
| DE | 102008050169 | 5/2009 |
| GB | 2454341 A | 6/2009 |
| JP | 06-221138 | 8/1994 |
| JP | 2000-297625 | 10/2000 |
| JP | 2000297625 | 10/2004 |

* cited by examiner

SELECTIVE CATALYTIC REDUCTION SYSTEM USING ELECTRICALLY HEATED CATALYST

FIELD

The present disclosure relates to emission control systems, and more particularly to controlling emissions using an electrically heated catalyst.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engines emit exhaust gas that includes carbon monoxide (CO), hydrocarbons (HC), and nitrogen oxides (NOx). A diesel exhaust treatment system reduces the levels of CO, HC, and NOx in the exhaust gas. The diesel exhaust treatment system may include a diesel oxidation catalyst (DOC), a diesel particulate filter (DPF), and a selective catalytic reduction (SCR) system. The DOC oxidizes CO and HC to form carbon dioxide and water. The DPF removes diesel particulate matter from the exhaust gas. The SCR system reduces NOx.

The SCR system involves injecting a reducing agent (e.g., urea) into the exhaust gas upstream from an SCR catalyst. The reducing agent forms ammonia that reacts with NOx in the SCR catalyst. The reaction of ammonia and NOx in the SCR catalyst reduces the NOx and results in the emission of diatomic nitrogen and water.

SUMMARY

An exhaust system comprises N heating elements and a particulate matter (PM) filter. The N heating elements heat N portions of an exhaust gas. At least one of the N heating elements is coated with a first selective catalytic reduction (SCR) catalyst. The PM filter has an inlet that receives the N portions of the exhaust gas heated by the N heating elements. Each of the N portions of the exhaust gas heats a corresponding region of the inlet. N is an integer greater than 1.

A method comprises heating N heating elements to a predetermined temperature, wherein the N heating elements heat N portions of an exhaust gas, and wherein at least one of the N heating elements is coated with a first selective catalytic reduction (SCR) catalyst. The method further comprises controlling an amount of reducing agent injected into the exhaust gas based on an amount of the first SCR catalyst that has a temperature greater than or equal to the predetermined temperature. Each of the N portions of the exhaust gas heats a corresponding region of a particulate matter (PM) filter. N is an integer greater than 1.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A selective catalytic reduction (SCR) system includes an SCR catalyst that aids in the reduction of nitrogen oxides (NOx) in exhaust gas. The SCR catalyst operates efficiently when it reaches an operating temperature referred to as a light-off temperature. An SCR light-off system according to the present disclosure heats a portion of SCR catalyst to the light-off temperature using an electrical heater. A diesel particulate filter (DPF) that includes SCR catalyst may be located downstream relative to the electrical heater. The SCR light-off system controls an amount of reducing agent injected into the exhaust gas based on an amount of the SCR catalyst that has reached the light-off temperature. Additionally, the electrical heater of the SCR light-off system may regenerate the DPF.

Figure 1:
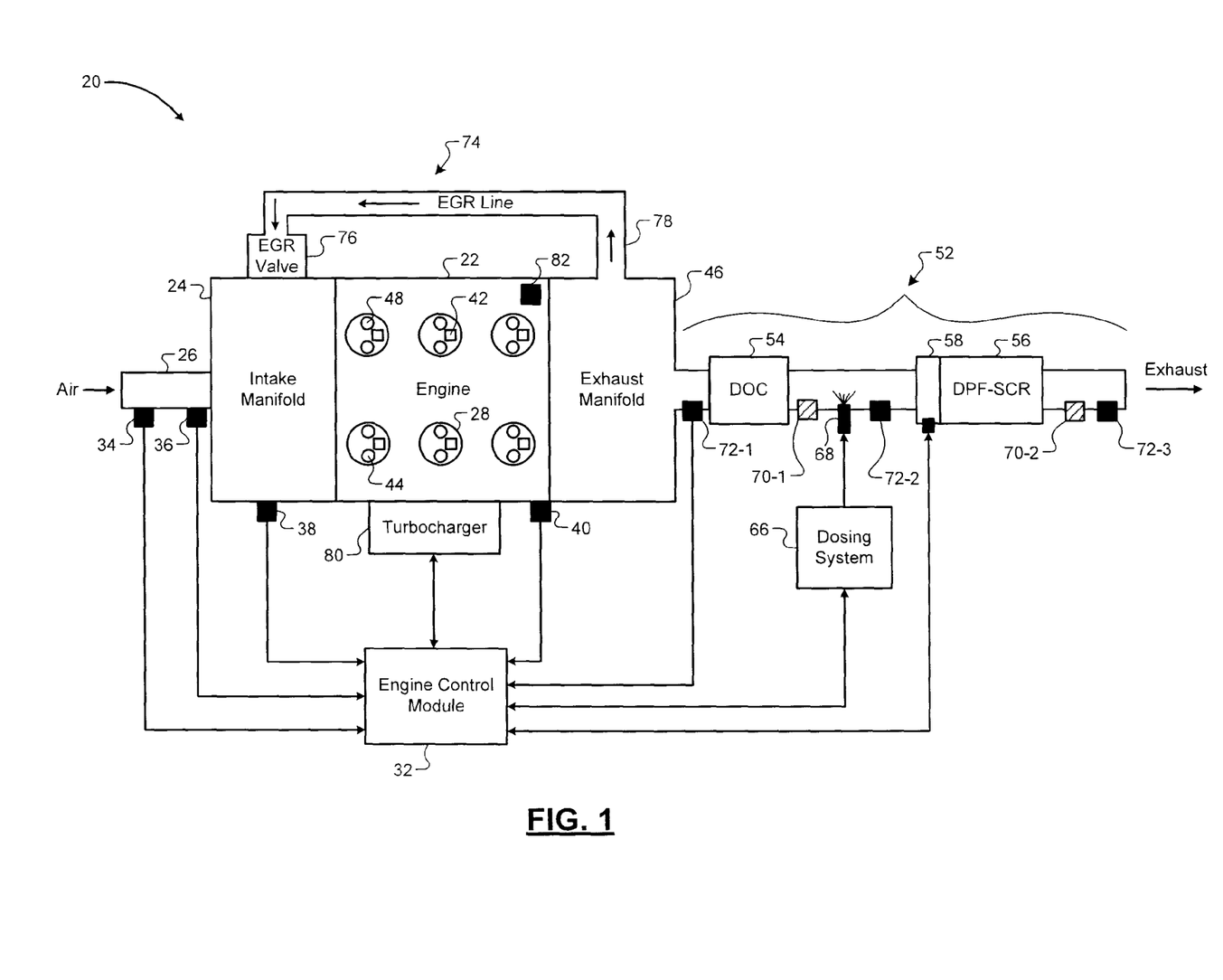
FIG. 1 is a functional block diagram of a diesel engine system according to the present disclosure.

Referring now to FIG. 1, a diesel engine system 20 includes an engine 22 that combusts an air/fuel mixture to produce drive torque. Air is drawn into an intake manifold 24 through an inlet 26. A throttle (not shown) may be included in the inlet 26 to regulate air flow into the intake manifold 24. Air within the intake manifold 24 is distributed into cylinders 28. Although FIG. 1 depicts six cylinders 28, the engine 22 may include additional or fewer cylinders 28.

The diesel engine system 20 includes an engine control module (ECM) 32 that communicates with components of the diesel engine system 20. The components may include the engine 22, sensors, and actuators. The ECM 32 may implement the SCR light-off system of the present disclosure.

Air is passed from the inlet 26 through a mass airflow (MAF) sensor 34. The MAF sensor 34 generates a MAF signal that indicates a mass flow rate of air flowing through the MAF sensor 34. An intake air temperature (IAT) sensor 36 located in the inlet 26 generates an IAT signal based on intake air temperature. A manifold pressure (MAP) sensor 38 is positioned in the intake manifold 24 between the inlet 26 and the engine 22. The MAP sensor 38 generates a MAP signal that indicates air pressure in the intake manifold 24.

An engine crankshaft (not shown) rotates at engine speed or a rate that is proportional to the engine speed. A crankshaft sensor 40 generates a crankshaft position (CSP) signal that indicates rotation of the crankshaft. The ECM 32 may determine the engine speed and cylinder events based on the CSP signal. The engine speed and cylinder events may be sensed using other suitable methods.

The ECM 32 actuates fuel injectors 42 to inject fuel into the cylinders 28. An intake valve 44 selectively opens and closes to enable air to enter the cylinder 28. An intake camshaft (not shown) regulates a position of the intake valve 44. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates a position of the exhaust valve 48.

An exhaust treatment system 52 may treat the exhaust gas. The exhaust treatment system 52 may include a diesel oxidation catalyst (DOC) 54. The DOC 54 oxidizes carbon monoxide and hydrocarbons in the exhaust gas. The exhaust treatment system 52 includes a diesel particulate filter (hereinafter "DPF-SCR 56"). The DPF-SCR 56 may include a first portion of SCR catalyst. For example, the DPF-SCR 56 may be coated with the first portion of SCR catalyst. The first portion of SCR catalyst is hereinafter referred to as a "DPF-SCR catalyst." The DPF-SCR 56 removes diesel particulate matter from the exhaust gas. The DPF-SCR catalyst uses a reducing agent to reduce NOx in the exhaust gas.

The exhaust treatment system 52 includes an electrical heater 58 (hereinafter "SCR heater 58"). The SCR heater 58 may include a second portion of SCR catalyst. For example, the SCR heater 58 may be coated with the second portion of SCR catalyst. The second portion of SCR catalyst uses the reducing agent to reduce NOx in the exhaust gas. The second portion of SCR catalyst is hereinafter referred to as an "SCR heater catalyst." The DPF-SCR catalyst and the SCR heater catalyst may be referred to collectively as the "SCR catalyst."

The SCR heater 58 may include one or more resistive heating elements (hereinafter "heating elements"). The heating elements may include the SCR heater catalyst. For example, the heating elements may be coated with the SCR heater catalyst. The ECM 32 may apply a voltage and/or current to the heating elements of the SCR heater 58 to heat the heating elements. Accordingly, the ECM 32 may heat the SCR heater catalyst coated onto the heating elements. Applying the voltage and/or current to the heating elements may hereinafter be referred to as "actuating the heating elements and/or SCR heater 58."

The SCR catalyst operates efficiently when it reaches an operating temperature referred to as a light-off temperature. For example, the light off temperature of the SCR catalyst may be 200° C. The catalyst may be referred to as "active" when the temperature of the catalyst is greater than the light-off temperature.

The SCR heater 58 may be located upstream relative to the DPF-SCR 56. Accordingly, the exhaust gas may interact with the SCR heater 58 before interacting with the DPF-SCR 56. For example only, the SCR heater 58 may be connected to the DPF-SCR 56. The SCR heater 58 and the DPF-SCR 56 may be in thermal communication when the SCR heater 58 and the DPF-SCR 56 are connected.

Figure 2A:
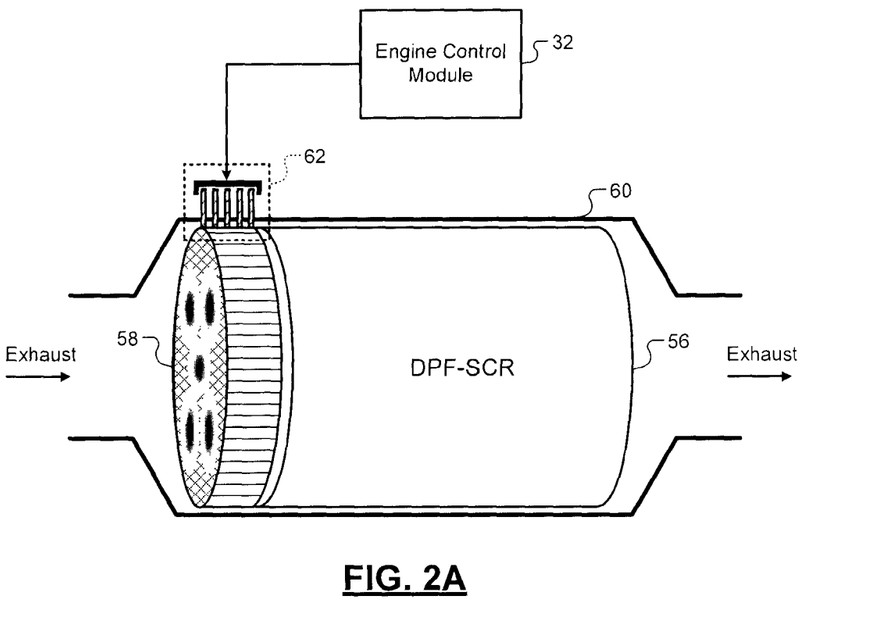
FIG. 2A illustrates an electrical heater coated with a selective catalytic reduction (SCR) catalyst and a diesel particulate filter coated with an SCR catalyst according to the present disclosure.

Referring now to FIG. 2A, in some implementations, the SCR heater 58 and the DPF-SCR 56 may be included in a canister 60. The SCR heater 58 and the DPF-SCR 56 may be connected, as illustrated in FIG. 2A. Accordingly, the SCR heater 58 and the DPF-SCR 56 may be in thermal communication. The ECM 32 communicates with the SCR heater 58 via interconnects 62. The interconnects 62 may include electrical connections between the ECM 32 and the heating elements of the SCR heater 58. The ECM 32 may apply the voltage and/or current to the heating elements of the SCR heater 58 via the interconnects 62.

Figure 2B:
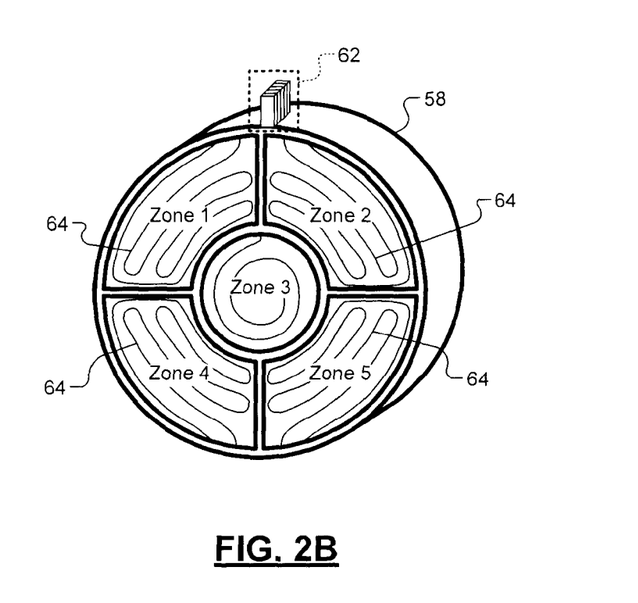
FIG. 2B illustrates zones of the electrical heater that are heated by heating elements according to the present disclosure.

Referring now to FIG. 2B, heating elements 64 of the SCR heater 58 may heat separate sections of the SCR heater 58. Each separate section of the SCR heater 58 may be called a zone. The SCR heater 58 of FIG. 2B includes 5 zones. The ECM 32 may actuate the heating elements 64 to heat the corresponding zones of the SCR heater 58. The SCR heater 58 may heat the exhaust gas flowing through the SCR heater 58. Accordingly, the zones of the SCR heater 58 may heat corresponding regions of the DPF-SCR 56.

The ECM 32 may actuate all of the heating elements 64 simultaneously to uniformly heat the SCR heater 58. The ECM 32 may intermittently actuate all of the heating elements 64. For example, the ECM 32 may apply pulses of voltage and/or current to all of the heating elements 64 to intermittently actuate all of the heating elements 64.

Alternatively, the ECM 32 may sequentially actuate separate heating elements 64. For example, the ECM 32 may actuate a single heating element 64 that corresponds to a single zone for a predetermined heating period. Subsequently, the ECM 32 may actuate a different heating element that corresponds to a different zone. Accordingly, the ECM 32 may actuate single heating elements 64 corresponding to different zones in order to heat all of the zones of the SCR heater 58. Sequentially actuating the separate heating elements 64 may uniformly heat the SCR heater 58.

The ECM 32 may sequentially actuate separate heating elements 64 to reduce an amount of power used to heat the heating elements 64 to the light-off temperature. For example only, a power supply (not shown) of the diesel engine system 20 may be incapable of providing enough power to heat all of the zones of the SCR heater 58, but may be capable of providing enough power to heat a single zone to the light-off temperature.

In some implementations, the ECM 32 may actuate the SCR heater 58 to regenerate the DPF-SCR 56. Accordingly, the ECM 32 may actuate the SCR heater 58 to combust particulate matter accumulated in the DPF-SCR 56. For example, the ECM 32 may actuate the SCR heater 58 to heat the exhaust gas entering the DPF-SCR 56 to regenerate the DPF-SCR 56. Additionally, the SCR heater 58 may regenerate the DPF-SCR 56 using conduction when the SCR heater 58 is connected to the DPF-SCR 56.

Referring back to FIG. 1, the diesel engine system 20 includes a dosing system 66. The dosing system 66 stores the reducing agent. For example, the reducing agent may include a urea/water solution. The reducing agent is mixed with the exhaust gas to carry out the reduction of NOx on the SCR catalyst. The dosing system 66 may pressurize the reducing agent for delivery to a reducing agent injector 68 (hereinafter "injector 68"). The ECM 32 may actuate the dosing system 66 to control a pressure of the reducing agent for delivery to the injector 68. The ECM 32 may actuate the injector 68 to control the amount of the reducing agent injected into the exhaust gas flowing through the exhaust treatment system 52. The ECM 32 may apply a voltage and/or current to the injector 68 to actuate the injector 68.

The exhaust treatment system 52 may include NOx sensors 70-1 and 70-2 (collectively NOx sensors 70). Each NOx sensor 70 generates a NOx level signal that indicates an amount of NOx in the exhaust gas. The NOx sensors 70 indicate the amount of NOx in the exhaust gas upstream and downstream of the SCR heater 58 and the DPF-SCR 56. The ECM 32 may use the NOx level signals to determine a conversion efficiency of the SCR catalyst. Accordingly, the ECM 32 may determine the amount of reducing agent to inject into the exhaust gas based on the NOx level signals. While two NOx sensors 70 are shown in FIG. 1, the exhaust treatment system 52 may include more or less than two NOx sensors 70.

The exhaust treatment system 52 may include exhaust temperature sensors 72-1, 72-2, and 72-3 (collectively exhaust temperature sensors 72). Each exhaust temperature sensor 72 generates an exhaust temperature signal that indicates a temperature of the exhaust gas. The exhaust temperature sensors 72 may measure temperatures of the exhaust gas upstream relative to the DOC 54, the SCR heater 58, and the DPF-SCR 56. The exhaust temperature sensors 72 may also measure a temperature of the exhaust gas downstream relative to the DOC 54, the SCR heater 58, and the DPF-SCR 56. While three exhaust temperature sensors 72 are shown in FIG. 1, the exhaust treatment system 52 may include more or less than three temperature sensors 72.

The diesel engine system 20 may include an EGR system 74. The EGR system 74 includes an EGR valve 76 and an EGR line 78. The EGR system 74 may introduce a portion of the exhaust gas from the exhaust manifold 46 into the intake manifold 24. The EGR valve 76 may be mounted on the intake manifold 24. The EGR line 78 may extend from the exhaust manifold 46 to the EGR valve 76, providing communication between the exhaust manifold 46 and the EGR valve 76. The ECM 32 may actuate the EGR valve 76 to increase or decrease an amount of the exhaust gas introduced into the intake manifold 24.

The engine 22 may include a turbocharger 80. The turbocharger 80 may be driven by the exhaust gas received through a turbine inlet. For example only, the turbocharger 80 may include a variable nozzle turbine. The turbocharger 80 increases airflow into the intake manifold 24 to cause an increase in intake manifold pressure (i.e., boost pressure). The ECM 32 may actuate the turbocharger 80 to selectively restrict the flow of the exhaust gas, thereby controlling the boost pressure.

The engine 22 may include an engine coolant temperature (ECT) sensor 82. The ECT sensor 82 may be located within the engine 22 or at other locations where the engine coolant is circulated, such as a radiator (not shown). The ECT sensor 82 may generate an ECT signal that indicates engine coolant temperature. The ECM 32 may determine a temperature of the engine 22 based on the ECT signal.

Figure 3:
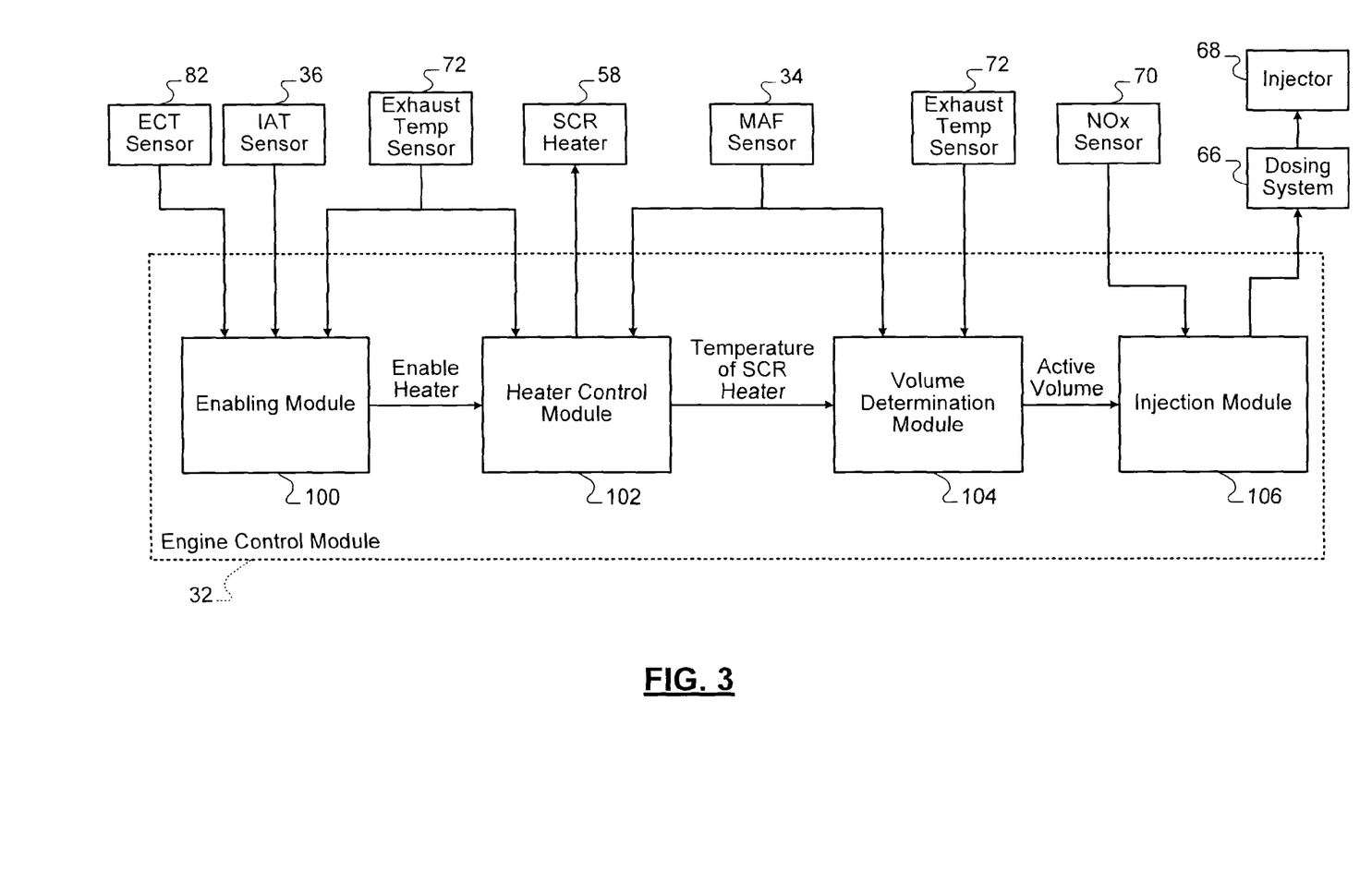
FIG. 3 is a functional block diagram of an engine control module according to the present disclosure.

Referring now to FIG. 3, the ECM 32 includes an enabling module 100, a heater control module 102, a volume determination module 104, and an injection module 106. The enabling module 100 determines when to implement the SCR light-off system. The heater control module 102 actuates the heating elements 64 to activate the SCR heater catalyst. The volume determination module 104 determines the amount of DPF-SCR catalyst that is active when the SCR heater catalyst is active. The injection module 106 determines the amount of reducing agent to inject into the exhaust gas based on the amount of SCR catalyst that is active.

The ECM 32 receives input signals from the diesel engine system 20. The input signals may include one or more of the MAF, IAT, MAP, CSP, NOx level, exhaust temperature, and/or ECT signals. The input signals are hereinafter referred to as "engine system signals." The ECM 32 processes the engine system signals and generates timed engine control commands that are output to the diesel engine system 20. The engine control commands may actuate the fuel injectors 42, the heating elements 64, the dosing system 66, the injector 68, the EGR valve 76, and the turbocharger 80.

The ECM 32 may implement the SCR light-off system to activate the SCR catalyst when the temperature of the SCR catalyst is less than a predetermined catalyst temperature. The predetermined catalyst temperature may include the light-off temperature. The temperature of the SCR catalyst may be less than the predetermined catalyst temperature during a cold start. Additionally, the temperature of the SCR catalyst may be less than the predetermined catalyst temperature during operation of the engine 22 when the exhaust gas flowing past the SCR catalyst reduces the temperature of the SCR catalyst below the predetermined catalyst temperature.

The enabling module 100 determines whether the temperature of the SCR catalyst is less than the predetermined catalyst temperature. In some implementations, the enabling module 100 determines that the temperature of the SCR catalyst is less than the predetermined catalyst temperature when the enabling module 100 detects a cold start. The enabling module 100 may detect the cold start based on the temperature of the engine coolant and the temperature of the intake air. For example, the enabling module 100 may detect the cold start when a difference between the temperature of the engine coolant and the temperature of the intake air is less than a predetermined temperature. The enabling module 100 may determine the temperature of the engine coolant and the temperature of the intake air based on the ECT and the IAT signals, respectively.

In other implementations, the enabling module 100 determines that the temperature of the SCR catalyst is less than the predetermined catalyst temperature during operation of the engine 22. The enabling module 100 may determine that the temperature of the SCR catalyst is less than the predetermined catalyst temperature during operation of the engine 22 based on the temperature of the exhaust gas. The enabling module 100 may determine the temperature of the exhaust gas based on the exhaust temperature signals. The enabling module 100 instructs the heater control module 102 to actuate the SCR heater 58 when the temperature of the SCR catalyst is less than the predetermined catalyst temperature.

The heater control module 102 may actuate the SCR heater 58 when the temperature of the SCR heater catalyst and/or the DPF-SCR catalyst is less than the predetermined catalyst temperature. The heater control module 102 may actuate the heating elements 64 of the SCR heater 58 to heat the SCR heater catalyst to the predetermined catalyst temperature.

The heater control module 102 may actuate all of the heating elements 64 simultaneously to uniformly heat the SCR heater 58. Alternatively, the heater control module 102 may sequentially actuate separate heating elements 64. The heater control module 102 may sequentially actuate separate heating elements 64 to reduce an amount of power used to heat the heating elements 64 to the predetermined catalyst temperature. Sequentially actuating the separate heating elements 64 may uniformly heat the SCR heater 58.

The heater control module 102 determines whether a temperature of the SCR heater 58 is greater than the predetermined catalyst temperature. The heater control module 102 may determine the temperature of the SCR heater 58 based on the voltage and/or current applied to the heating elements 64 of the SCR heater 58. The heater control module 102 may also determine the temperature of the SCR heater 58 based on the temperature of the exhaust gas, a flow rate of the exhaust gas, and the amount of NOx in the exhaust gas.

The heater control module 102 may determine the temperature of the exhaust gas based on the exhaust temperature signals and/or exhaust temperature modeling based on the engine system signals. The heater control module 102 may determine the flow rate of the exhaust gas based on the engine system signals that indicate an airflow into the engine 22 (e.g., MAF) and an amount of fuel injected into the cylinders 28. Generally, the voltage and/or current applied to the heating elements 64 may increase the temperature of the SCR heater 58 while the flow of the exhaust gas may tend to decrease the temperature of the SCR heater 58.

The heater control module 102 may determine the temperature of the SCR heater 58 based on the amount of NOx in the exhaust gas. For example, the heater control module 102 may use the NOx level signals to determine the conversion efficiency of the SCR heater catalyst. Accordingly, the conversion efficiency of the SCR heater catalyst may indicate the amount of the SCR heater catalyst that has reached the predetermined catalyst temperature. The heater control module 102 outputs the temperature of the SCR heater 58 to the volume determination module 104.

The volume determination module 104 determines the amount of SCR catalyst that is active when the temperature of the SCR heater 58 is greater than the predetermined catalyst temperature. The volume determination module 104 may determine the amount of SCR catalyst that is active based on an amount of SCR heater catalyst that is active and an amount of DPF-SCR catalyst that is active. For example, all of the SCR heater catalyst may be active when the temperature of the SCR heater 58 is greater than the predetermined catalyst temperature.

The DPF-SCR catalyst may not be active when the temperature of the SCR heater 58 is greater than the predetermined catalyst temperature. The exhaust gas flowing through the DPF-SCR 56 may heat the DPF-SCR catalyst to the predetermined catalyst temperature. The volume determination module 104 may determine the amount of DPF-SCR catalyst that is active based on the amount of the exhaust gas flowing through the DPF-SCR 56. For example, the volume determination module 104 may determine the amount of DPF-SCR catalyst that is active based on the temperature of the exhaust gas, the flow rate of the exhaust gas, and an amount of time the exhaust gas has been flowing through the DPF-SCR 56.

The volume determination module 104 may determine the temperature of the exhaust gas based on the exhaust temperature signals and/or exhaust temperature modeling based on the engine system signals. The volume determination module 104 may determine the flow rate of the exhaust gas based on the engine system signals that indicate the airflow into the engine 22 (e.g., MAF) and the amount of fuel injected into the cylinders 28.

Additionally, the volume determination module 104 may determine the amount of DPF-SCR catalyst that is active based the amount of NOx in the exhaust gas. For example, the volume determination module 104 may use the NOx level signals to determine the conversion efficiency of the DPF-SCR catalyst. Accordingly, the conversion efficiency of the DPF-SCR catalyst may indicate the amount of the DPF-SCR catalyst that is active. The volume determination module 104 outputs a value to the injection module 106 that indicates the amount of SCR catalyst that is active.

The injection module 106 may control an amount of reducing agent injected into the exhaust gas based on the amount of SCR catalyst that is active and an amount of NOx present in the exhaust gas. The injection module 106 may actuate the dosing system 66 and the injector 68 to control the amount of reducing agent injected into the exhaust gas. The injection module 106 may determine the amount of NOx present in the exhaust gas based on the NOx level signals.

The DPF-SCR catalyst may not be activated until the DPF-SCR catalyst is heated by the exhaust gas. Accordingly, the injection module 106 may initially control the amount of reducing agent injected into the exhaust gas based on the amount of SCR heater catalyst that is active when the SCR heater catalyst is initially greater than the predetermined catalyst temperature. The exhaust gas may progressively activate the DPF-SCR catalyst during operation of the engine 22. Accordingly, the injection module 106 may control the amount of reducing agent injected into the exhaust gas according to a current amount of the SCR heater catalyst and the DPF-SCR catalyst that is activated. After a period of time, all of the DPF-SCR catalyst may be active.

Figure 4:
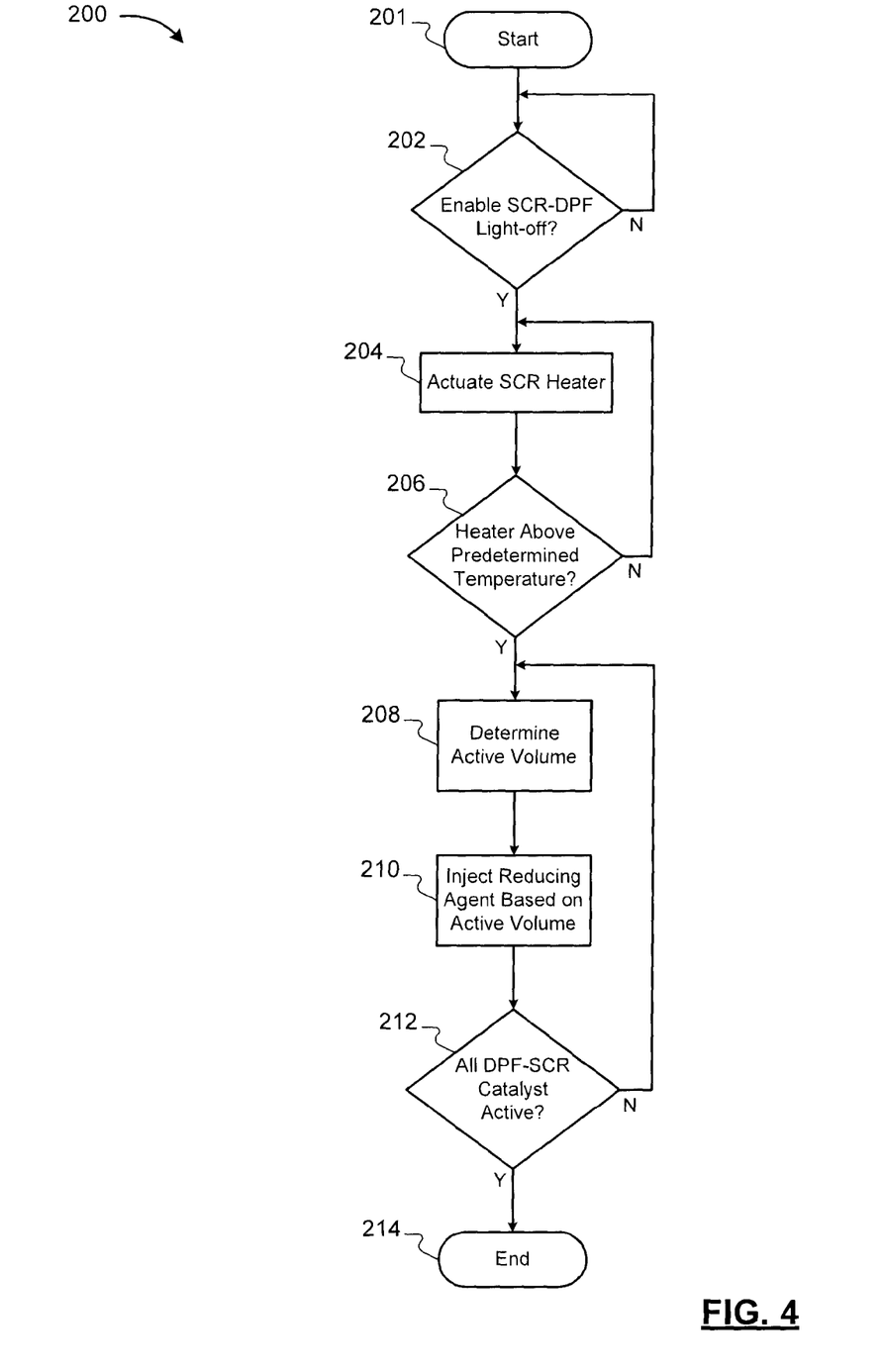
FIG. 4 illustrates a method for heating an SCR catalyst according to the present disclosure.

Referring now to FIG. 4, a method 200 for heating an SCR catalyst starts in step 201. In step 202, the enabling module 100 determines whether the temperature of the SCR heater catalyst is less than the predetermined catalyst temperature. If the result of step 202 is false, the method 200 repeats step 202. If the result of step 202 is true, the method 200 continues with step 204. In step 204, the heater control module 102 actuates the SCR heater 58 to heat the SCR heater catalyst. In step 206, the heater control module 102 determines whether the temperature of the SCR heater 58 is greater than the predetermined catalyst temperature. If the result of step 206 is false, the method 200 repeats step 204. If the result of step 206 is true, the method 200 continues with step 208.

In step 208, the volume determination module 104 determines the amount of SCR catalyst that is active. In step 210, the injection module 106 controls the amount of the reducing agent injected into the exhaust gas based on the amount of SCR catalyst that is active. In step 212, the volume determination module 104 determines whether all of the DPF-SCR catalyst is active. If the result of step 212 is false, the method 200 repeats step 208. If the result of step 212 is true, the method 200 continues with step 214. The method 200 ends in step 214.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An exhaust system comprising:
   N heating elements that heat N portions of an exhaust gas, wherein at least one of the N heating elements is coated with a first selective catalytic reduction (SCR) catalyst;
   a particulate matter (PM) filter having an inlet that receives the N portions of the exhaust gas heated by the N heating elements, wherein each of the N portions of the exhaust gas heats a corresponding region of the inlet, and wherein N is an integer greater than 1; and
   an engine control module that heats the N heating elements to a predetermined temperature and that controls an amount of reducing agent injected into the exhaust gas based on an amount of the first SCR catalyst that has a temperature greater than or equal to the predetermined temperature.

2. The exhaust system of claim 1 further comprising a heater control module that sequentially applies current to each of the N heating elements to heat the N heating elements to a predetermined temperature.

3. The exhaust system of claim 1 wherein the N heating elements are connected to the PM filter.

4. The exhaust system of claim 1 further comprising a heater control module that heats the N heating elements to regenerate the PM filter.

5. The exhaust system of claim 1 wherein the predetermined temperature is greater than or equal to a light-off temperature of the first SCR catalyst.

6. An exhaust system comprising:
N heating elements that heat N portions of an exhaust gas, wherein at least one of the N heating elements is coated with a first selective catalytic reduction (SCR) catalyst;
a particulate matter (PM) filter having an inlet that receives the N portions of the exhaust gas heated by the N heating elements, wherein each of the N portions of the exhaust gas heats a corresponding region of the inlet, and wherein N is an integer greater than 1, and wherein the PM filter is coated with a second SCR catalyst; and
an engine control module that heats the N heating elements to a predetermined temperature and that controls an amount of reducing agent injected into the exhaust gas based on an amount of the second SCR catalyst that has a temperature greater than or equal to the predetermined temperature.

7. The exhaust system of claim 6 wherein the predetermined temperature is greater than or equal to a light-off temperature of the second SCR catalyst.

8. An exhaust system comprising:
N heating elements that heat N portions of an exhaust gas, wherein at least one of the N heating elements is coated with a first selective catalytic reduction (SCR) catalyst;
a particulate matter (PM) filter having an inlet that receives the N portions of the exhaust gas heated by the N heating elements, wherein each of the N portions of the exhaust gas heats a corresponding region of the inlet, and wherein N is an integer greater than 1; and
an engine control module that:
sequentially applies current to each of the N heating elements to heat the N heating elements to a predetermined temperature, and
determines the amount of the first SCR catalyst that has a temperature greater than or equal to the predetermined temperature based on at least one of current applied to the N heating elements, a temperature of the exhaust gas, and a flow rate of the exhaust gas.

9. A method comprising:
heating N heating elements to a predetermined temperature, wherein the N heating elements heat N portions of an exhaust gas, and wherein at least one of the N heating elements is coated with a first selective catalytic reduction (SCR) catalyst; and
controlling an amount of reducing agent injected into the exhaust gas based on an amount of the first SCR catalyst that has a temperature greater than or equal to the predetermined temperature,
wherein each of the N portions of the exhaust gas heats a corresponding region of a particulate matter (PM) filter, and wherein N is an integer greater than 1.

10. The method of claim 9 further comprising sequentially applying current to each of the N heating elements to heat each of the N heating elements to the predetermined temperature.

11. The method of claim 9 further comprising heating the N heating elements to regenerate the PM filter.

12. The method of claim 9 further comprising:
heating the N heating elements to a light-off temperature; and
controlling the amount of reducing agent injected into the exhaust gas based on the amount of the first SCR catalyst that has a temperature greater than or equal to the light-off temperature.

13. The method of claim 9 further comprising heating the N portions of the exhaust gas to heat corresponding regions of the PM filter that include a second SCR catalyst.

14. The method of claim 13 further comprising controlling the amount of reducing agent injected into the exhaust gas based on an amount of the second SCR catalyst that has a temperature greater than or equal to the predetermined temperature.

15. The method of claim 13 further comprising:
heating the N heating elements to a light-off temperature; and
controlling the amount of reducing agent injected into the exhaust gas based on the amount of the second SCR catalyst that has a temperature greater than or equal to the light-off temperature.

16. The method of claim 13 further comprising determining the amount of the first and second portions of SCR catalyst that has a temperature greater than or equal to the predetermined temperature based on at least one of a current applied to the N heating elements, a temperature of the exhaust gas, and a flow rate of the exhaust gas.

* * * * *